(12) United States Patent
Kirtz et al.

(10) Patent No.: US 7,845,114 B2
(45) Date of Patent: Dec. 7, 2010

(54) INTERCONNECTABLE PLANT TRAY

(75) Inventors: Kevin Kirtz, Massillon, OH (US); Fred Schromm, Uniontown, OH (US)

(73) Assignee: Landmark Plastic Corporation, Akron, OH (US)

( * ) Notice: Subject to any disclaimer, the term of this patent is extended or adjusted under 35 U.S.C. 154(b) by 59 days.

(21) Appl. No.: 12/335,313

(22) Filed: Dec. 15, 2008

(65) Prior Publication Data

US 2009/0151247 A1 Jun. 18, 2009

Related U.S. Application Data

(60) Provisional application No. 61/013,726, filed on Dec. 14, 2007.

(51) Int. Cl.
*A01G 9/02* (2006.01)
(52) U.S. Cl. .......................................................... 47/87
(58) Field of Classification Search ...................... 47/86, 47/73, 65.9, 87
See application file for complete search history.

(56) References Cited

U.S. PATENT DOCUMENTS

| 1,989,403 | A | | 1/1935 | Dauernheim | |
|---|---|---|---|---|---|
| 2,219,870 | A | * | 10/1940 | Jacobus | 47/86 |
| 2,455,295 | A | | 11/1948 | Cox | |
| 2,704,928 | A | | 3/1955 | Curry | |
| 3,009,291 | A | | 11/1961 | Blackmore | |
| 3,542,210 | A | | 11/1970 | Sorensen | |
| D229,073 | S | | 11/1973 | Brickel et al. | |
| D229,708 | S | * | 12/1973 | Dugan-Chapman | D11/143 |
| 3,825,126 | A | | 7/1974 | Pohl et al. | |
| 3,857,342 | A | * | 12/1974 | Johns | 108/53.3 |
| 4,000,580 | A | | 1/1977 | Biehl | |
| 4,118,892 | A | * | 10/1978 | Nakamura et al. | 47/65.9 |
| 4,123,271 | A | | 10/1978 | Fushida et al. | |
| 4,205,485 | A | | 6/1980 | Olsen | |
| 4,242,834 | A | | 1/1981 | Olsen | |
| 4,330,059 | A | | 5/1982 | Freeman | |
| 4,532,891 | A | | 8/1985 | Jones | |
| 4,597,550 | A | | 7/1986 | Rice, Sr. | |
| 4,756,119 | A | | 7/1988 | Chabot | |
| 4,999,946 | A | | 3/1991 | DeGiglio et al. | |

(Continued)

FOREIGN PATENT DOCUMENTS

DE 2318187 11/1974

(Continued)

*Primary Examiner*—Francis T Palo
(74) *Attorney, Agent, or Firm*—Bret A. Hrivnak; Hahn Loeser & Parks, LLP

(57) ABSTRACT

Apparatus and methods for connecting an interconnectable plant tray to a complementary plant tray are provided. In particular embodiments of the present invention include an interconnectable plant tray comprising a tray having one or more sides and one or more storage receptacles. The tray further includes a connection region positioned along at least one of the sides for connecting the tray to a complementary tray, the connection region including a first portion and a second portion, the portions being separated by a notch. The tray also has one or more coupling members located along the first portion of the connection region, and one or more coupling receptacles for receiving coupling members of the complementary tray, the one or more coupling receptacles being located within the second portion of the connection region. In particular embodiments, the complementary tray is substantially identical to the interconnectable tray.

20 Claims, 5 Drawing Sheets

U.S. PATENT DOCUMENTS

| | | |
|---|---|---|
| 5,152,098 A | 10/1992 | Hall |
| 5,174,534 A | 12/1992 | Mitchell |
| 5,298,041 A | 3/1994 | Huang |
| D349,615 S * | 8/1994 | McLaughlin ................. D6/403 |
| 5,511,755 A | 4/1996 | Spykerman |
| 5,592,775 A | 1/1997 | Dew |
| 5,613,605 A | 3/1997 | Angeles et al. |
| 5,664,370 A | 9/1997 | Boudreau et al. |
| 5,890,318 A | 4/1999 | Hammerle |
| 6,050,027 A | 4/2000 | Pavelka et al. |
| D425,767 S * | 5/2000 | Goslin et al. .................... D8/1 |
| 6,125,577 A | 10/2000 | Merzweiler et al. |
| 6,455,127 B1 * | 9/2002 | Valtanen .................... 428/137 |
| 6,536,361 B1 * | 3/2003 | Wu ............................ 111/114 |
| 6,606,823 B1 * | 8/2003 | McDonough et al. ........ 47/65.9 |
| 7,020,997 B1 * | 4/2006 | Thomas ......................... 47/39 |
| 7,144,201 B2 * | 12/2006 | DeArmond, Jr. ............ 405/286 |
| 2007/0124996 A1 | 6/2007 | Hall |
| 2009/0151247 A1 * | 6/2009 | Kirtz et al. ..................... 47/87 |

FOREIGN PATENT DOCUMENTS

| | | |
|---|---|---|
| EP | 0635201 | 1/1995 |
| FR | 78 32991 | 6/1980 |
| JP | 2004065141 A * | 3/2004 |
| NL | 7613359 | 12/1976 |
| NL | 7713224 | 11/1977 |

* cited by examiner

INTERCONNECTABLE PLANT TRAY

This application claims priority to, and the benefit of, U.S. provisional patent application Ser. No. 61/013,726, filed Dec. 14, 2007, which is hereby incorporated by reference.

FIELD OF THE INVENTION

The present disclosure relates generally to containers and trays, and more particularly to an interconnectable tray. The interconnectable tray may connected, joined, or attached to a second interconnectable plant tray, and may be used for growing, storing, and/or transporting plants, or potting any variety of plant or seed.

BACKGROUND OF THE INVENTION

Trays are generally used to transport potted plants, grow multiple varieties of plants, or for other commercial or agricultural purposes. The trays are usually created from one piece of material and may form a unit with multiple compartments for planting and storing seeds, plants, or to hold other containers. Plant trays may be set side by side in greenhouses, or other agricultural/commercial areas, and arranged independently of each other. In this arrangement, the trays are not connected to one another. If the user desires to collectively transport, sell or grow multiple plant varieties/sizes in a single tray, the various plants or seeds must be placed in the single tray. This can be difficult and inconvenient when having to relocate (transplant) a plant from its corresponding tray to the single tray. Accordingly, there is a need to provide a plant tray that is interconnectable with another tray, so that additional plants, or different plants, for example, may be added or combined with the existing tray by attaching to the existing tray a second or subsequent tray containing the additional and/or different plants.

SUMMARY OF THE INVENTION

Particular embodiments of the present invention include interconnectable plant trays, and methods of using the same. Particular embodiments of the present invention includes is an interconnectable plant tray comprising a tray having one or more sides and one or more storage receptacles. The tray further includes a connection region positioned along at least one of the sides for connecting the tray to a complementary tray, the connection region including a first portion and a second portion, the portions being separated by a notch. The tray also has one or more coupling members located along the first portion of the connection region, and one or more coupling receptacles for receiving coupling members of the complementary tray, the one or more coupling receptacles being located within the second portion of the connection region. In particular embodiments, the complementary tray is substantially similar or identical to the interconnectable tray.

Particular embodiments of the present invention include an interconnected plant tray having a first tray and a second tray. Each of the trays include one or more sides and one or more storage receptacles; a connection region positioned along at least one of the sides, the connection region including a first portion and a second portion, the portions being separated by a notch; a coupling member located along the first portion of the connection region; and, a coupling receptacle located within the second portion of the connection region. In particular embodiments, the first and second trays are attached, and the coupling member of the first tray engages the coupling receptacle of the second tray, and the coupling member of the second tray engages the coupling receptacle of the first tray.

Particular embodiments of the present invention include a method for forming an interconnected plant tray having the steps of: providing a first plant tray having one or more sides, one or more storage receptacles, and a connection region, the region being divided into a first portion and a second portion by a notch; providing a second plant tray having one or more sides, one or more storage receptacles, and a connection region, the region being divided into a first portion and a second portion by a notch; and, coupling the connection region of the first tray with the connection region of the second tray, wherein the notch of the first tray is aligned with the notch of the second tray such that the first portion of the first tray engages the second portion of the second tray, and the first portion of the second tray engages the second portion of the first tray.

These and other exemplary embodiments of the present tray will be described in more detail by the drawings and detailed description.

BRIEF DESCRIPTION OF THE DRAWINGS

One or more exemplary embodiments of the interconnectable plant tray are described below by reference to the following figures.

DETAILED DESCRIPTION OF THE DRAWINGS

Figure 1:
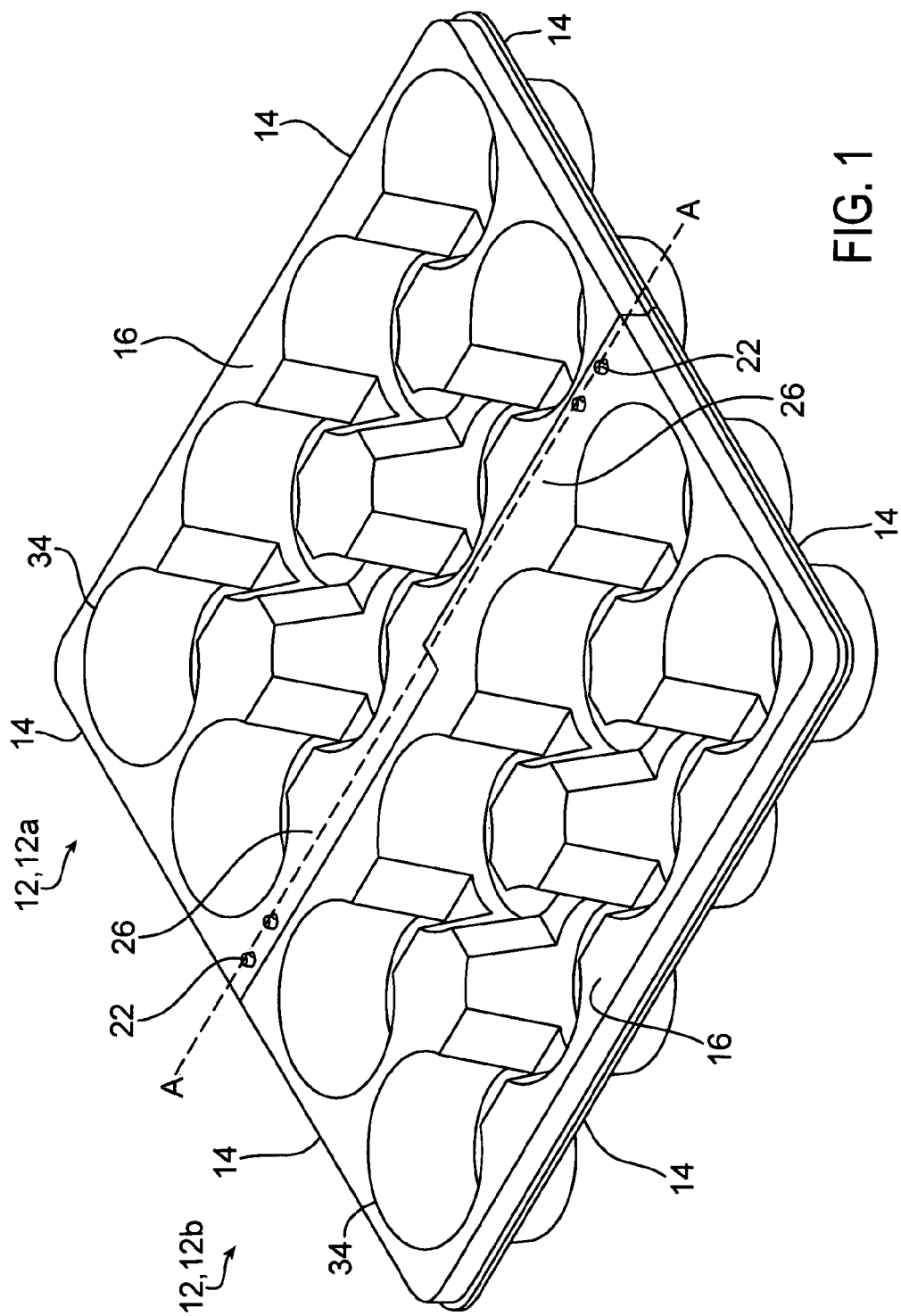
FIG. 1 is a perspective view of two interconnectable trays in an interconnected arrangement, according to an embodiment of the present invention.

Referring now to the drawings, FIG. 1 shows an exemplary tray 12, 12*a* that may be interconnected with (i.e., connected, joined, or attached to) a corresponding tray 12, which is referred to herein as a complementary tray 12*b*. A complimentary tray 12*b* may be a second tray having substantially the same or identical design of tray 12*a* (i.e., a tray of the same size and design of tray 12*a*), or may comprise any other sized or shaped tray designed to couple with tray 12*a*. In the application shown in FIG. 1, complimentary tray 12*b* is substantially the same as tray 12*a*. It is also contemplated that complimentary tray 12*b* may have substantially the same connection region 20 along a side 14, but may otherwise comprise a different tray design, which may include, for example, having a different configuration of storage receptacles 34, each of which is discussed in more detail below.

The present tray 12*a* has one or more sides 14, a top surface 16, a connection region 20, and a plurality of storage receptacles 34. The tray 12 may be constructed from a moldable material, which includes without limitation, polymeric materials such as thermoplastic elastomers, polyurethanes, or other plastic materials. In other applications, tray 12 may be constructed from any other materials, such as metal. The tray 12 may be created by various methods including, without limitation, sheet extrusion, thermoforming, or injection molding.

Figure 2:
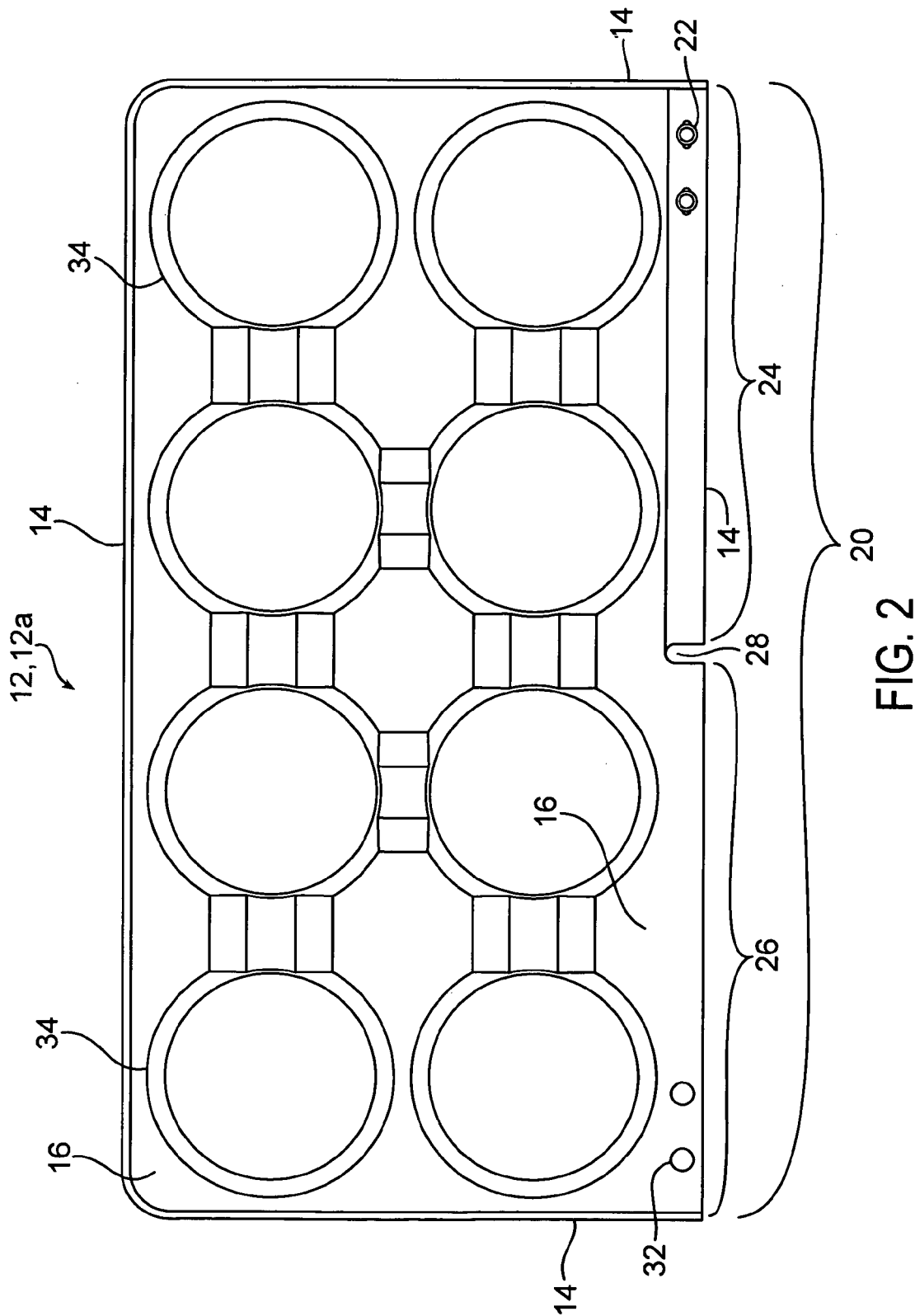
FIG. 2 is a top view of one interconnectable tray shown in FIG. 1, according to an embodiment of the invention.
Figure 3:
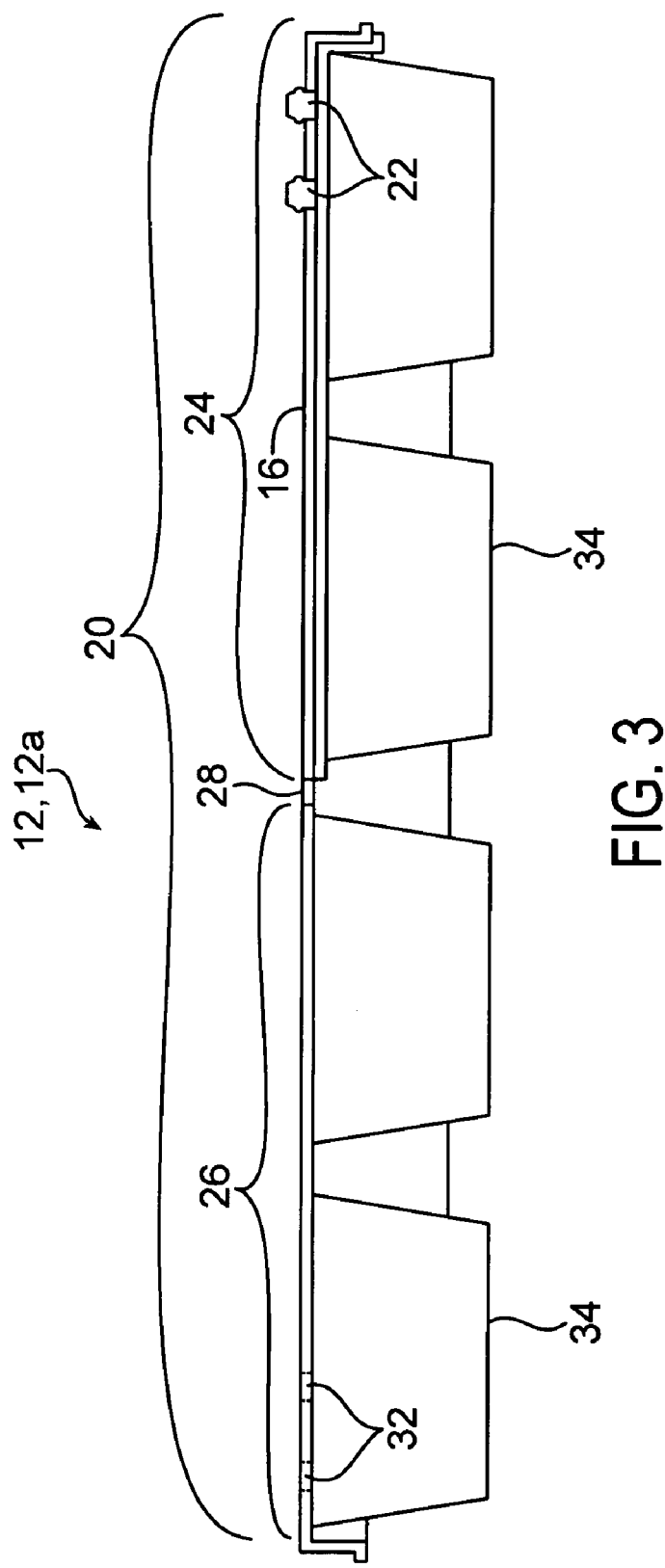
FIG. 3 is a side view of the tray shown in FIG. 2, according to an embodiment of the invention.

Referring to FIGS. 1-3, tray 12 includes one or more sides 14 that form a rectangular-shaped tray 12. In other applications, one or more sides 14 may form any other shape, including, without limitation, any circular, elliptical, square, polygon, or arbitrary shape. It is noted that the dimensions shown in the FIGURES are exemplary only, and should not be construed as limiting. Such as shown most clearly in FIGS. 1 and 3, by example, sides 14 may form a profiled edge that extends upwardly and/or downwardly from top surface 16 to provide structural integrity to the tray 12a for improved bending or buckling strength or resistance. Sides 14 may be used to facilitate the transportation of tray 12a, for holding an identification tag, and/or for storing the tray 12a. One or more sides 14 of the tray 12 may also function to couple tray 12a to a complementary tray 12b by including a connection region 20.

Tray 12 may also include a top surface 16 and one or more (or a plurality of) storage receptacles 34. Storage receptacles 34 may positioned in any desired arrangement. Storage receptacles 34 are configured to hold or store one or more plants, soil or growing medium, seedlings, and/or containers, such as, for example, a plant or seedling pot. Storage receptacles 34 may comprise any design known or obvious to one having ordinary skill in the art. For example, in the application shown, storage receptacles 34 are recessed compartments, wherein one or more sides extend from an opening (aperture) to hold one or more target objects, such as, for example, growing medium or a plant or seedling pot. Each storage receptacles 34 may also include a bottom surface extending from one more of the compartment sides. In a further example, in lieu of a recess, a storage receptacle 34 may comprise a hole or aperture, such as, for example, within top surface 16, for placing and storing a container or the like. Storage receptacles 34 may be formed as a monolithic structure with tray 12, or may be attached to tray 12 to form a unitary tray 12.

In the embodiment generally shown in FIGS. 1-4B, at least one of the sides 14 of tray 12 includes a connection region 20 for joining a tray 12a to a complementary tray 12b. Connection region 20 may function to permanently or releasably couple tray 12a to complementary tray 12b. In the present application, connection region 20 extends longitudinally along a side 14 of the tray 12, and comprises a first portion 24, a second portion 26, a notch 28, one or more coupling members 22, and one or more coupling receptacles 32. In the application shown, connection region 20 also extends along top surface 16.

Figure 4B:
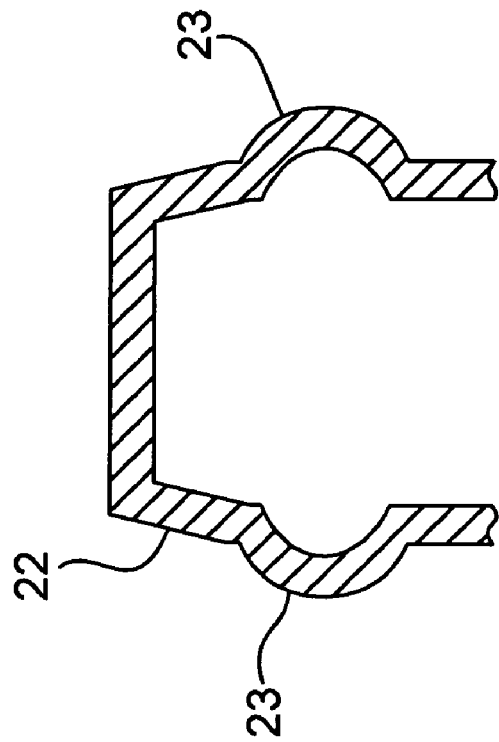
FIG. 4B is an enlarged cross-sectional side view of the coupling member shown in FIG. 2 according to an embodiment of the invention.
Figure 4A:
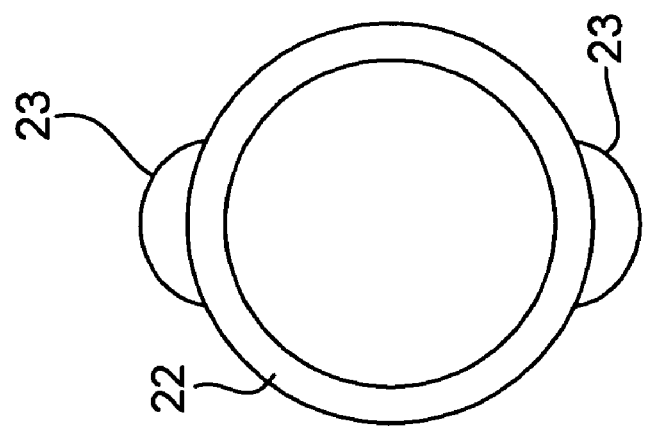
FIG. 4A is an enlarged top view of the coupling member shown in FIG. 2, according to an embodiment of the invention.

With continued reference to the application shown in FIGS. 2-3, first portion 24 has one or more coupling members 22, while second portion 26 has one or more coupling receptacles 32. A coupling member 22 having one or more ridges or protrusions 23 is designed to interoperate with an associated or corresponding coupling receptacle 32 of a complementary tray 12b, such that each such coupling receptacle 32 becomes attached to, constrained by, a corresponding coupling member 22, such as by mechanical interference, to connect or join a tray 12a to a complementary tray 12b. It is contemplated that coupling member 22 and coupling receptacle 32 may each comprise any complimentary shape or design. For example, coupling members 22 may comprise a cylinder or frusto-conical member (such as shown in FIGS. 4A-4B), or a ridge-like protrusion extending linearly or curvilinearly along tray 12 (not shown), each of which engages a corresponding coupling receptacle 32 that extends similarly. In the application shown in the FIGURES, coupling receptacle 32 is an aperture; however, coupling receptacle 32 may comprise any other shape or member. For example, coupling receptacle 32 may comprise a compartment extending from an aperture or hole along surface 16 and configured for receiving a coupling member 22. It is also contemplated that each coupling member 22 may be formed monolithically with tray 12, or may be attached to tray 12 to form a unitary tray 12.

In the exemplary configuration shown generally in FIGS. 1-3, and more specifically in FIGS. 4A-4B, coupling member 22 includes one or more receptacle-retaining protrusions 23 extending outwardly from a portion of connection region 20. Receptacle-retaining protrusions 23 facilitate securement between coupling member 22 and a corresponding coupling receptacle 32 by providing improved resistance against decoupling forces. Protrusion 23 may extend partially or fully about a perimeter of coupling member 22. Protrusion 23 is generally designed to pass through coupling receptacle 32, to provide a snap-fit between coupling member 22 and coupling receptacle 32. While coupling member 22 may comprise any design known or obvious to one having ordinary skill in the art for coupling member 22 with coupling receptacle 32, the coupling of trays 12a, 12b may be achieved or reinforced by use of spot welding, adhesives, fasteners, or any other means of securing the trays to one having ordinary skill in the art, with or without the existence of coupling members 22 and coupling receptacle 32. For example, a pin or other fastener may penetrate through member 22 to mechanically interfere with the tray structure surrounding coupling receptacle 32, to prevent the removal of member 22 from coupling receptacle 32.

Figure 5:
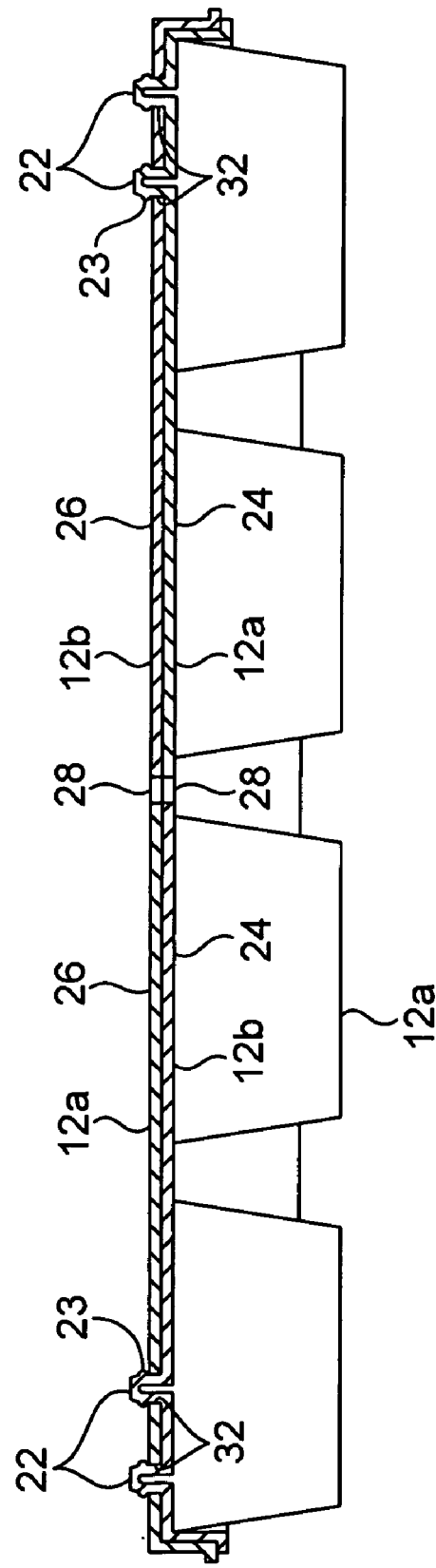
FIG. 5 is a cross-sectional side view of Section A-A of FIG. 1, showing the interconnection between the trays, according to an embodiment of the invention.

With continued reference to FIGS. 2-3, first portion 24 is separated from the second portion 26 by a notch 28. This allows the first portion 24 of each tray 12a, 12b to be positioned below a corresponding second portion 26 of the other tray 12a, 12b, or vice versa, which is shown in FIG. 5. To facilitate the above and below ("over/under") engagement between first and second portions 24, 26, one of the portions 24, 26 may be offset (i.e., recessed or raised) from top surface 16 to better facilitate the over/under engagement of portions 24, 26. In the exemplary application shown in FIGS. 1, 3, and 5, first portion 24 is recessed from top surface 16. This is most clearly shown in FIG. 3.

In the application shown in the FIGURES, notch 28 is centrally located between first portion 24 and second portion 26, that is, in other words, notch 28 is located midway along the side 14 hosting connection region 20 is located. This allows tray 12b to be a tray substantially similar to tray 12a, and/or, a tray having a connection region 20 substantially similar to the connection region 20 of tray 12a. In other applications, notch 28 may be positioned at any other location along connection region 20 or along side 14, and thereby separating the first portion 24 from the second portion 26 anywhere along a side 14 or connecting region 20.

As stated above, in the application shown, coupling members 22 extend upwardly from first portion 24, while coupling receptacles 32 are positioned within second portion 26. In other arrangements, coupling members 22 and coupling receptacles 32 may be positioned within either or both of the first and second portions 24, 26. For example, coupling members 22 may extend downwardly from second portion 26, while coupling receptacle 32 are positioned within first portion 24. By further example, one or more coupling members 22 may be located on both portions 24, 26, where the one or more coupling members 22 of portion 24 extend in an opposite vertical direction from the one or more coupling members 22 located on portion 26 (for example, members 22 of first portion may extend vertically, while members 22 of second portion extend downwardly).

With reference to FIG. 5, a tray 12a is shown attached or interconnected to a complementary tray 12b, in cross-section. FIG. 5 shows each coupling member 22 of tray 12a connected, engaged, or mated with a corresponding coupling receptacle 32 of a complementary tray 12b, and vice versa. Coupling member 22 and a corresponding coupling receptacle 32, upon engagement, become joined or attached after one or more receptacle-retaining projection 23 passes through or into coupling receptacle 32. As mentioned above, attachment may be permanent, temporary, or capable of detachment (i.e., coupling member 22 is removably attached to coupling receptacle 32).

The coupling member 22 and coupling receptacle 32 are configured to couple at least one side 14 of tray 12a to at least one side 14 of a complementary tray 12b. In one embodiment, the complementary tray 12b is substantially identical to tray 12a, which is rotated and oriented, such that the first portion 24 of the first tray 12a is located adjacent to (above or below) the second portion 26 of the second tray 12b. Accordingly, in such embodiment, each tray 12a, 12b may include a coupling member 22 along the first portion 24 that is associated with a coupling receptacle 32 of second portion 26, or vice versa, where each such associated coupling member 22 and coupling receptacle 32 are located along a single line and an equal distance from the notch 28 in opposite directions along the single line. The line may be perpendicular to notch 28 and/or parallel to a side 14. Further, in such embodiment, notch 28 is located midway between each associated coupling member 22 and coupling receptacle 32. In other embodiments, it is contemplated that tray 12a may have two or more sides 14 having a connection region 20, to facilitate the attachment of more than one complementary tray 12b to tray 12a. Further, it is contemplated that two or more complementary trays 12b may be attached to a single side 14 of tray 12a.

The present exemplary embodiments include a method for interconnecting (i.e., connecting, joining, or attaching) individual trays described according to the present disclosure. Each tray 12a and 12b may be independently provided or used before being joined.

In operation, the tray 12a, as shown in FIGS. 1 and 5 in an exemplary embodiment, may be connected to a complementary tray 12b to form a joined (i.e., interconnected) unit. In one embodiment, the complementary tray 12b is substantially identical to tray 12a. When a user desires to join a tray 12a to a complementary tray 12b, the connection region 20 of the tray 12a may be coupled to the connection region 20 of the complementary tray 12b. The connection regions 20 may be coupled together through one or more associated coupling members 22 and coupling receptacles 32. Generally the notches 28 of tray 12 and the complementary tray are interconnected, so that one of the first or second portions 24, 26 of tray 12a is located atop a corresponding portion 26, 24 of the complementary tray 12b, and the other of the portions 24, 26 of tray 12a is located below the corresponding portion 26, 24 of the complementary tray 12b. For example, with reference to FIGS. 1 and 5, the first portion 24 of tray 12a generally aligns with the second portion 26 of a complementary tray 12b to permanently or releasably connect (i.e., being detachable) a coupling member 22 of the first portion 24 of tray 12a with a coupling receptacle 32 of the second portion 26 of the complementary tray 12b. Further, the second portion 26 of tray 12 generally aligns with the first portion 24 of the complementary tray 12b to permanently or releasably connect a coupling member 22 of a complementary tray 12b with a coupling receptacle 32 of tray 12a.

In a releasably connected arrangement, the connection region 20 of the tray 12a may be detached from the connection region 20 of the complementary tray 12b. To disengage a tray 12a from a complementary tray 12b, a coupling member 22 is pulled or withdrawn from the corresponding coupling receptacle 32. After each of the coupling members 22 is released from each associated coupling receptacle 32, the trays 12a, 12b are separated for independent use.

While the invention has been described with detailed reference to one or more embodiments, the disclosure is to be considered as illustrative and not restrictive. Modifications and alterations will occur to those skilled in the art upon a reading and understanding of this specification. It is intended to include all such modifications and alterations in so far as they come within the scope of the claims, or the equivalence thereof.

What is claimed is:

1. An interconnectable plant tray comprising:
   a tray having one or more sides, a perimeter circumscribing the one or more tray sides, and one or more storage receptacles positioned within the perimeter;
   a connection region positioned along at least one of the sides for connecting the tray to a complementary tray, the connection region including a first portion and a second portion, each of the portions forming an extension having a top and bottom surface and protruding outwardly in a generally lateral direction from the associated side, the first and second portions extending along the associated side and being separated by a notch, the bottom surface of one of the first and second portions being shaped to at least partially engage a top surface of the other of the first and second portions of a complimentary tray and the top surface of one of the first and second portions being shaped to at least partially receive a bottom surface of the other of the first and second portions of a complimentary tray when the interconnectable tray is connected to the complimentary tray having a connection region similar to the connection region of the interconnectable tray;
   one or more coupling members extending outwardly from the first portion of the connection region in a direction generally normal to lateral direction of the tray; and,
   one or more coupling receptacles each arranged to receive one of the coupling members from the first portion of the complementary tray, the one or more coupling receptacles being located within the second portion of the connection region.

2. The interconnectable plant tray of claim 1, wherein one of the coupling receptacles and one of the connecting members are located along a common line, and the coupling receptacle and the connecting member are each located substantially the same distance from the notch in opposing directions.

3. The interconnectable plant tray of claim 1, wherein the notch is positioned midway along the side having the connection region.

4. The interconnectable plant tray of claim 1, wherein the top surfaces of the first and second portions are vertically offset.

5. The interconnectable plant tray of claim 1, wherein each of the coupling members includes one or more receptacle-retaining projections extending from a side of each such coupling member.

6. The interconnectable plant tray of claim 1, wherein each of the coupling receptacles comprise an aperture extending through a thickness of the second portion.

7. The interconnectable plant tray of claim 1, wherein the storage receptacle includes a volume configured to retain a growing medium, a plant, one or more seeds, or a container.

8. The interconnectable plant tray of claim 1, wherein the interconnectable plant tray is attached to a complementary tray, the complementary comprising:
   one or more sides, a perimeter circumscribing the one or more tray sides, and one or more storage receptacles positioned within the perimeter;
   a connection region positioned along at least one of the sides for connecting the tray to the interconnectable plant tray, the connection region including a first portion and a second portion, each of the portions forming an extension having a top and bottom surface and protruding outwardly in a generally lateral direction from the associated side, the first and second portions extending along the associated side and being separated by a notch, the bottom surface of one of the first and second portions being shaped to at least partially engage a top surface of the other of the first and second portions of the interconnectable plant tray and the top surface of one of the first and second portions being shaped to at least partially receive a bottom surface of the other of the first and second portions of the interconnectable plant when the complimentary tray is connected to the interconnectable plant tray;
   one or more coupling members extending outwardly from the first portion of the connection region in a direction generally normal to lateral direction of the tray; and,
   one or more coupling receptacles each arranged to receive one of the coupling members from the first portion of the interconnectable plant tray, the one or more coupling receptacles being located within the second portion of the connection region,
   wherein the interconnectable tray and the complimentary tray are connected by interconnecting the corresponding connection regions such that the coupling member of the interconnectable tray receives the coupling receptacle of the complimentary tray, the coupling member of the complimentary tray receives the coupling receptacle of the interconnectable tray, the top surface of the one of the first and second portions of the interconnectable tray at least partially engages the bottom surface of the other of the first and second portions of the complimentary tray, and the bottom surface of the one of the first and second portions of the interconnectable tray at least partially engages the top surface of the other of the first and second portions of the complimentary tray.

9. The interconnectable tray of claim 8, wherein the connection region of the interconnectable tray and the connection region of the complimentary tray are substantially the same.

10. The interconnectable tray of claim 9, wherein the interconnectable tray and the complimentary tray are substantially the same.

11. The interconnectable tray of claim 9, wherein the interconnectable tray and the complimentary tray are each monolithically formed.

12. An interconnected plant tray comprising:
   a first tray having:
      one or more sides, a perimeter circumscribing the one or more tray sides, and one or more storage receptacles positioned within the perimeter;
      a connection region positioned along at least one of the sides for connecting the first tray to a second tray, the connection region including a first portion and a second portion, each of the portions forming an extension having a top and bottom surface and protruding outwardly in a generally lateral direction from the associated side, the first and second portions extending along the associated side and being separated by a notch, the bottom surface of one of the first and second portions being shaped to at least partially engage a top surface of the other of the first and second portions of the second tray and the top surface of one of the first and second portions being shaped to at least partially receive a bottom surface of the other of the first and second portions of second tray when the first tray is connected to the second tray having a connection region similar to the connection region of the first tray;
      a coupling member extending outwardly from the first portion of the connection region in a direction generally normal to lateral direction of the tray; and,
      a coupling receptacle arranged to receive the coupling member of the second tray, the coupling receptacle being located within the second portion of the connection region;
   the second tray having:
      one or more sides, a perimeter circumscribing the one or more tray sides, and one or more storage receptacles positioned within the perimeter;
      a connection region positioned along at least one of the sides for connecting the second tray to the first tray, the connection region including a first portion and a second portion, each of the portions forming an extension having a top and bottom surface and protruding outwardly in a generally lateral direction from the associated side, the first and second portions extending along the associated side and being separated by a notch, the bottom surface of one of the first and second portions being shaped to at least partially engage a top surface of the other of the first and second portions of the first tray and the top surface of one of the first and second portions being shaped to at least partially receive a bottom surface of the other of the first and second portions of the first tray when the second tray is connected to the first tray;
      a coupling member extending outwardly from the first portion of the connection region in a direction generally normal to lateral direction of the tray; and,
      a coupling receptacle arranged to receive the coupling member of the second tray, the coupling receptacle being located within the second portion of the connection region.
   wherein the first and second trays are connected by interconnecting the corresponding connection regions, the coupling member of the first tray being received by the coupling receptacle of the second tray, the coupling member of the second tray being received by the coupling receptacle of the first tray, the top surface of the one of the first and second portions of the first tray at least partially engages the bottom surface of the other of the first and second portions of the second tray, and the bottom surface of the one of the first and second portions of the first tray at least partially engages the top surface of the other of the first and second portions of the second tray.

13. The interconnected plant tray of claim 12, wherein the connection portions of first tray and the second tray are substantially the same.

14. The interconnected plant tray of claim 12, wherein, for each of the first and second trays, the coupling receptacle and the connecting member is located along a common line, and the coupling receptacle and the connecting member each located substantially the same distance from the notch in opposing directions.

15. The interconnected plant tray of claim 12, wherein the notch is positioned midway along the side having the connection region for each of the first and second trays.

16. A method of forming an interconnected plant tray comprising the steps of:
providing a first plant tray having:
one or more sides and a perimeter circumscribing the one or more tray sides:
one or more storage receptacles positioned within the perimeter;
a connection region positioned along at least one of the tray sides, the region being divided into a first portion and a second portion by a notch, each of the portions forming an extension having a top and bottom surface and protruding outwardly in a generally lateral direction from the associated side, the first and second portions extending along the associated side;
a coupling member extending outwardly from the first portion of the connection region in a direction generally normal to lateral direction of the first tray; and,
a coupling receptacle for receiving the coupling member, the coupling receptacle being located within the second portion of the connection region;
providing a second plant tray having:
one or more sides and a perimeter circumscribing the one or more tray sides;
one or more storage receptacles positioned within the perimeter;
a connection region positioned along at least one of the tray sides, the region being divided into a first portion and a second portion by a notch, each of the portions forming an extension having a top and bottom surface and protruding outwardly in a generally lateral direction from the associated side, the first and second portions extending along the associated tray side;
a coupling member extending outwardly from the first portion of the connection region in a direction generally normal to lateral direction of the second tray; and,
a coupling receptacle for receiving the coupling member, the coupling receptacle being located within the second portion of the connection region; and,
coupling the connection region of the first tray with the connection region of the second tray by aligning the notch of the first tray with the notch of the second tray to overlay the second portion of the first tray over the first portion of the second tray and to overlay the second portion of the second tray over the first portion of the first tray, the step of coupling including inserting a coupling member of the first tray into a coupling receptacle of the second tray and inserting a coupling member of the second tray into a coupling receptacle of the first tray.

17. The method of claim 16, wherein, for each of the first and second trays, the coupling receptacle and the connecting member is located along a common line, and the coupling receptacle and the connecting member are each located substantially the same distance from the notch in opposing directions.

18. The method of claim 16, wherein the coupling member for each of the first and second trays includes one or more receptacle-retaining projections extending outwardly from a side of the coupling member.

19. The method of claim 16, wherein the connection region of the first tray is substantially the same as the connection region of the second tray.

20. The method of claim 16, wherein the notch is positioned midway along the side having the connection region for each of the first and second trays.

* * * * *